Oct. 11, 1949.  W. R. MATHIS  2,484,520
METHOD OF CONSTRUCTING GIRDERS AND CEILINGS
Filed Oct. 16, 1947  3 Sheets-Sheet 1

INVENTOR.
William R. Mathis
BY
ATTORNEYS.

Oct. 11, 1949.  W. R. MATHIS  2,484,520
METHOD OF CONSTRUCTING GIRDERS AND CEILINGS
Filed Oct. 16, 1947  3 Sheets-Sheet 2

Inventor
William R. Mathis
By
Lancaster, Allen & Rommel
Attorneys

Oct. 11, 1949. W. R. MATHIS 2,484,520
METHOD OF CONSTRUCTING GIRDERS AND CEILINGS
Filed Oct. 16, 1947 3 Sheets-Sheet 3

INVENTOR.
William R. Mathis
BY *Lancaster, Albuino & Rommel*
ATTORNEYS.

Patented Oct. 11, 1949

2,484,520

UNITED STATES PATENT OFFICE 2,484,520

METHOD OF CONSTRUCTING GIRDERS AND CEILINGS

William R. Mathis, Tampa, Fla.

Original application December 5, 1942, Serial No. 467,971. Divided and this application October 16, 1947, Serial No. 780,273

2 Claims. (Cl. 25—155)

This invention relates to the construction of girders and ceilings of reinforced concrete and more particularly to the method of producing same.

The present application is a division of a parent application filed by me December 5, 1942, Serial No. 467,971, disclosing molding apparatus for forming buildings, which has since matured in Patent No. 2,434,708 on January 20, 1948, wherein is disclosed and claimed apparatus for molding girders and for molding them integral with the walls of buildings. The apparatus thus disclosed is suitable for use in carrying out the present method, altho the method is not limited to use of such specific apparatus.

The principal object of the invention is to provide a method whereby the ceilings are molded after the girders have been shaped and the concrete has set, with suitable reinforcement carried thereby to tie the ceiling to the girders, and to utilize sectional columns in the support of the girder and ceiling forms, portions of the sectional columns being retained in place thruout steps in the method, or from the time the girder molds are in readiness to receive the concrete, until the ceiling material has been placed and has become set.

Other objects and advantages of the invention will appear in the following detailed description, taken in connection with the accompanying drawing, forming a part of this specification, and in which drawing—

Figure 1:
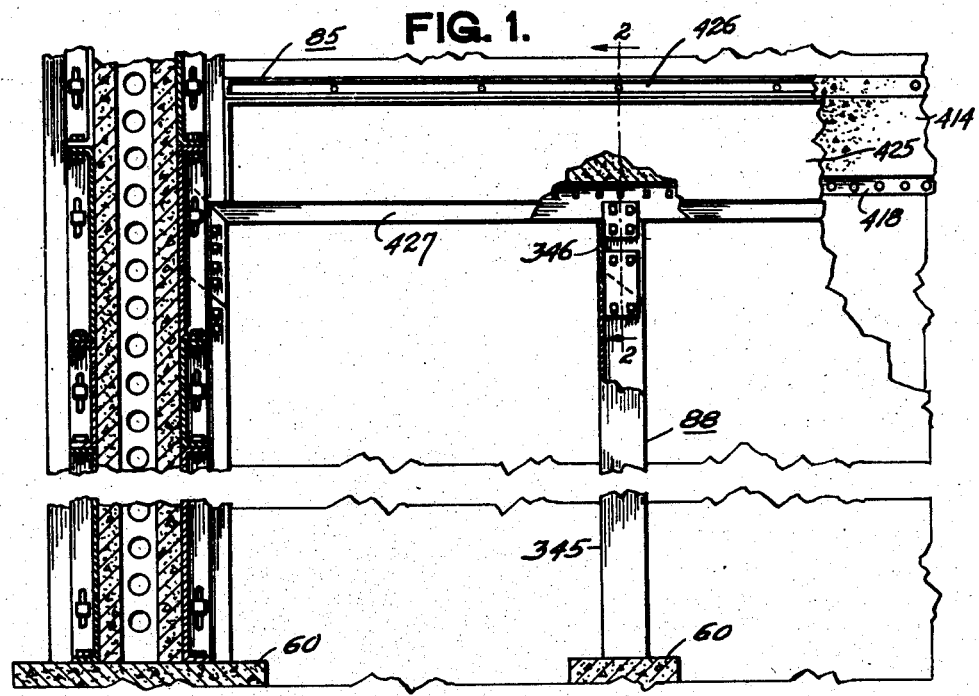
Fig. 1 is a fragmentary view partly in vertical section and partly in elevation showing a wall portion and a girder form in place, suitable for carrying out one of the steps of the method.

In carrying out the present method, suitable spaced girder molds 85 are provided, which carry body reinforcement members 407, 433 and 434 and portions of ceiling reinforcement 418. This assembly is supported by sectional columns 88 comprising major sections 345 and minor sections 346 and 440 which are interchangeable on the major sections 345. The columns 88 are supported on any suitable base or footing 60.

After cementitious material is poured in the molds 85, girders 414 are formed having portions of the reinforcement 418 extending from the lower portions thereof. To this reinforcement 418 is added suitable additional ceiling reinforcement 437, spanning the distance between the girders 414 and thereafter a suitable ceiling form 422 is provided, supported by the sectional columns 88. While the girder molds are supported by the columns, each column 88 comprises the major section 345 and the minor section 346, and while the ceiling form is being supported by the columns 88, each column comprises the major section 345 and the minor section 440.

The cementitious material to form the ceiling may be poured upon the ceiling form thru the space between the girders 414 and surrounds the ceiling reinforcement 418 and 437.

While the mold 85 may be of any suitable type, in the example shown, it comprises spaced side angle members 425, upper channel members 426, and lower channel members 427. The angle members 425 are arranged with their webs confronting one another and their flanges outstanding from the webs. The upper channel members 426 are similarly arranged, the webs supporting the reinforcement 433, in the nature of bridge bars extending between the webs of upper channel members 426. The lower channel members 427 are arranged with their webs uppermost and their flanges extending downwardly therefrom. These lower channel members are spaced apart so as to provide a slot 429 between the confronting flanges 429$^a$ thereof, for the reception of the ceiling reinforcement 418, as hereinafter described. The other or outer flanges 429$^b$ are preferably deeper and cooperate with the minor sections 346 of the columns 88, as may be observed in Fig. 2.

Figure 2:
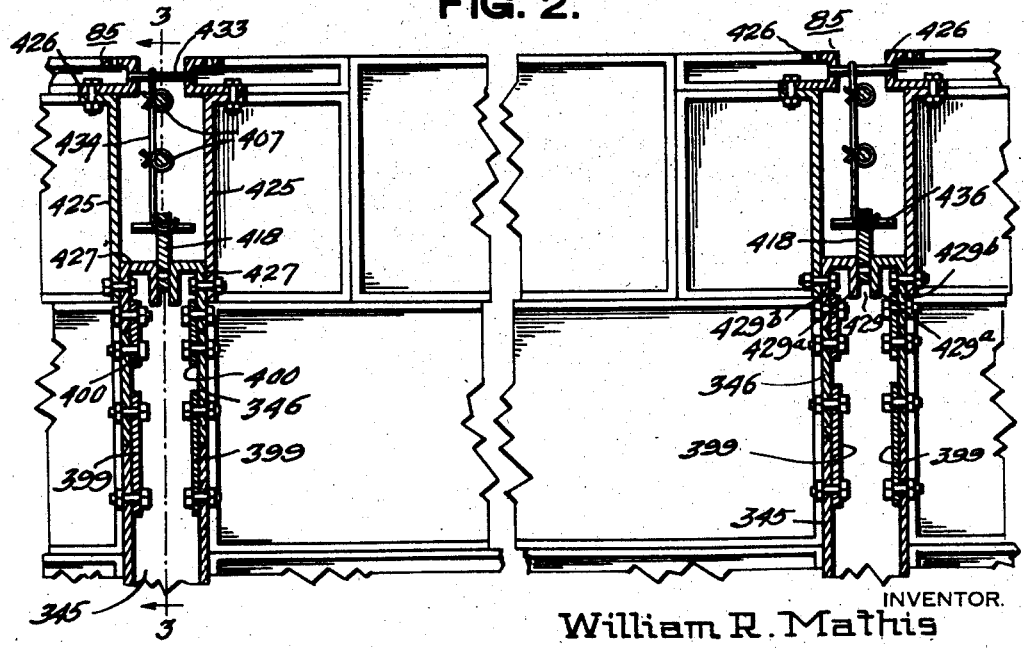
Fig. 2 is an enlarged sectional view on substantially the line 2—2 of Fig. 1.
Figure 5:
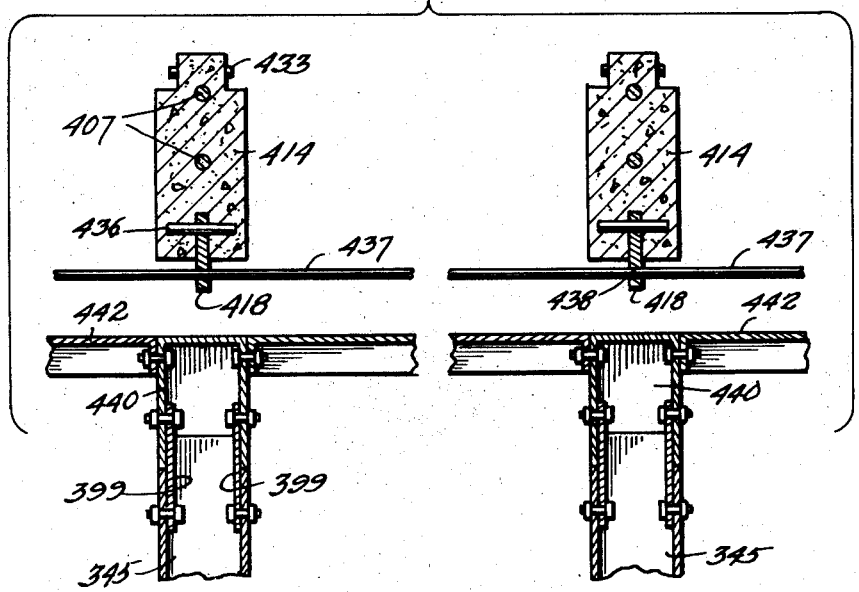
Fig. 5 is a similar view showing a ceiling form in relationship to the girder.
Figure 6:
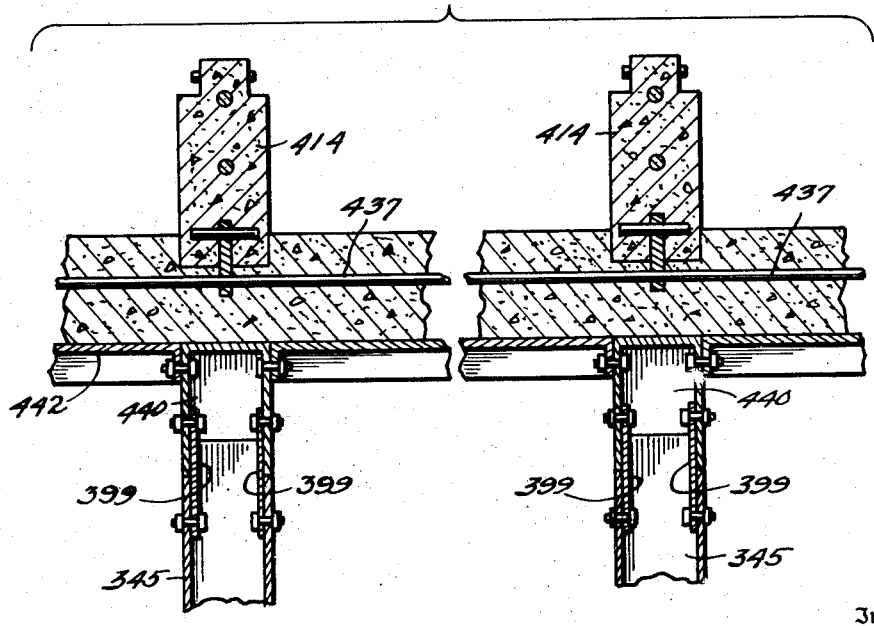
Fig. 6 is a similar view showing the ceiling in place, spanning the distance between two girders.
Figure 3:
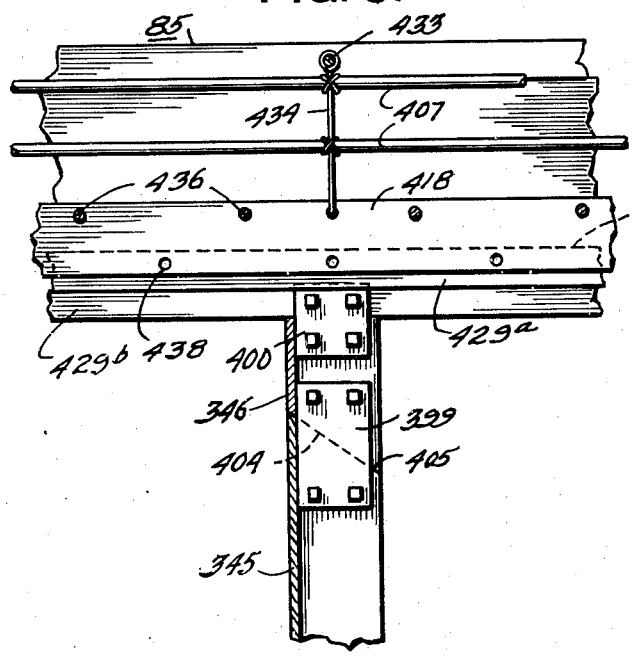
Fig. 3 is a sectional view on substantially the line 3—3 of Fig. 2.
Figure 7:
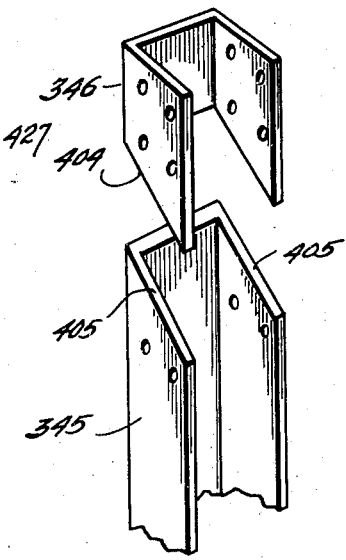
Fig. 7 is a fragmentary perspective view of sections of a suitable column which may be used in supporting girder mold.
Figure 4:
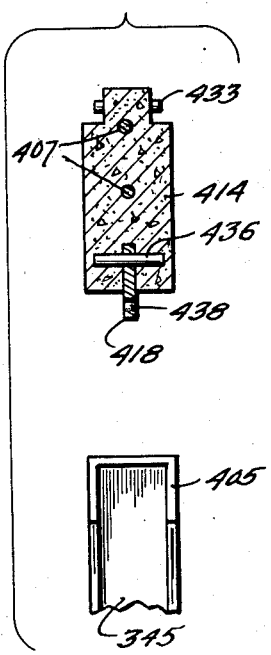
Fig. 4 is a view partly in vertical section and partly in elevation showing the completion of a girder and the removal of the mold therefrom.
Figure 8:
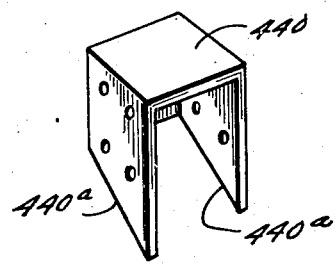
Fig. 8 is a perspective view of a column section which may be used in supporting a ceiling form.

The reinforcement 407 is shown as of the rod type, extending longitudinally of the mold 85, and is supported by reinforcement 434 in the nature of suspending wires connected to the bridge bars 433. These suspending wires are also connected to the reinforcement 418 as shown in Fig. 2.

The reinforcement 418 is preferably in the form of a metallic strip located to extend longitudinally of the mold 85, and thru the slot 429 so that its lower portion is exposed below the mold. This lower exposed portion is preferably provided with transverse holes 438 to facilitate attachment of the reinforcement 437 thereto. The reinforcement 418 may also comprise cross bars 436 along the upper portion of the bar which become embedded in the concrete.

The sectional columns 88 preferably have the upper portion of each major section 345 beveled as at 405 and the lower portions of each minor section 346 is accordingly beveled as at 404 at a corresponding angle. These two sections may be connected together with the beveled portions in engagement by plates 399 bolted or otherwise detachably connected thereto. The upper end of the minor section 346 may abut against the lower edges of the flanges 429$^b$, as shown in Fig. 2, and the minor sections 346 may be temporarily secured to the flanges 429$^b$ by plates 400 by bolts or other detachable connections.

It may be observed that, from this arrangement, upon detachment of the plates 399 and 400, the column section 346 may be eased away from the mold 85, after the girder material has set, and the mold removed, leaving a portion of the reinforcement 418 exposed beneath each girder, whereupon the reinforcement 437 may be placed extending thru the holes 438 as previously described.

This may be followed by the placing of the ceiling form 442, supported by the major sections 345 of the columns 88 and the minor sections 440 which, in the example shown have their lower portions beveled as at 440$^a$ to correspond with the bevel 405 of the major sections 345, detachably secured thereto by the plates 339.

After the ceiling material becomes set, the forms 442 may be removed, the minor sections 440 eased away from the ceiling, after removing the plates 339, and the major sections of the columns 88 removed from their footings.

The method greatly facilitates the construction of girders and ceilings since the girders may first be formed without interference with floor or ceiling forms. The columns 88 temporarily used in the support of molds and forms may be accurately placed and the major portions of these columns serve to progressively support the molds and forms, thruout the construction of the girders and ceilings.

I claim:

1. In a method of constructing girders and ceilings, those steps which consist in supporting spaced girder molds comprising removable forms providing a hollow for receiving cementitious material, and ceiling reinforcement extending below the hollow of the mold, by sectional columns; pouring cementitious material into the molds to form the girders; removing the girder forms and the upper sections of the columns when the cementitious material has set; supporting additional reinforcement by said ceiling reinforcement and spanning the distance between the girders; supporting a ceiling form spaced beneath said reinforcement, on the remaining portions of the columns; pouring cementitious material from above and between the girders, upon said ceiling form; and removing the ceiling form and the remaining portions of the columns after the ceiling cementitious material has set.

2. In a method of constructing girders and ceilings, those steps which consist in supporting spaced girder molds by sectional columns; pouring cementitious material into the molds to form the girders; removing the girder forms and the upper sections of the columns when the cementitious material has set; supporting ceiling reinforcement from the girders thus formed, spanning the distance between the girders; supporting a ceiling form spaced beneath said reinforcement, on the remaining portions of the columns; pouring cementitious material from above and between the girders, upon said ceiling form; and removing the ceiling form and the remaining portions of the columns after the ceiling cementitious material has set.

WILLIAM R. MATHIS.

REFERENCES CITED

The following references are of record in the file of this patent:

UNITED STATES PATENTS

| Number | Name | Date |
| --- | --- | --- |
| 962,295 | Arnn | June 21, 1910 |
| 1,630,794 | Keller | May 31, 1927 |
| 1,796,851 | Macomber | Mar. 17, 1931 |